Nov. 24, 1931.  E. T. HAGIST  1,833,462
ELECTRICAL CONDUIT FITTINGS
Filed Jan. 29, 1929   2 Sheets-Sheet 2
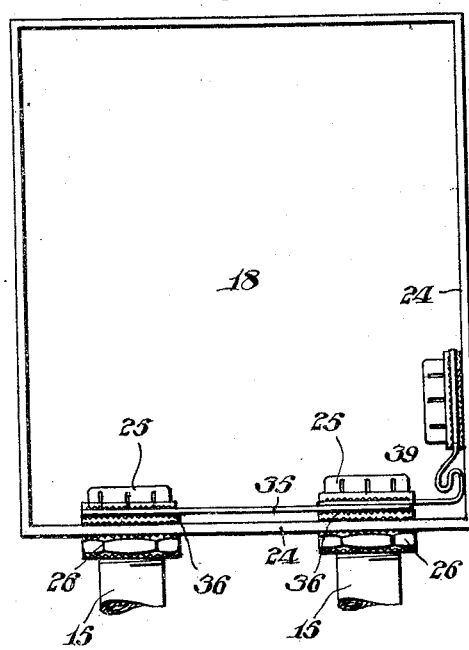
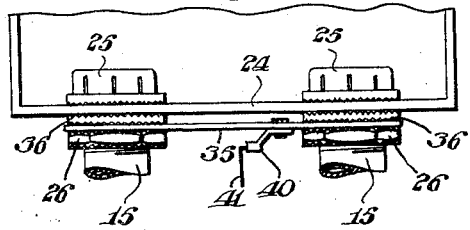
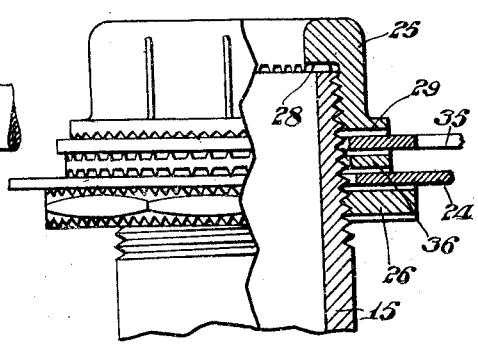
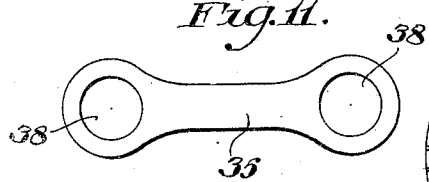
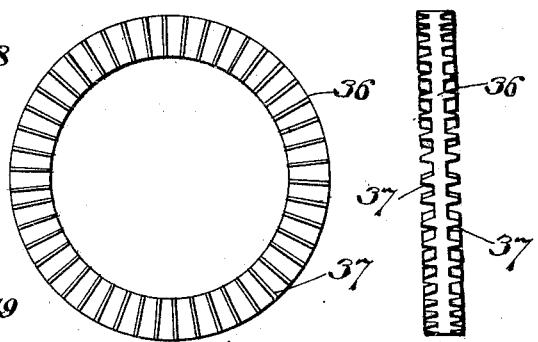
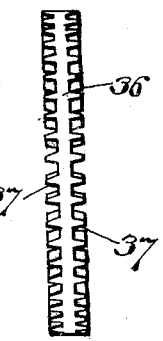
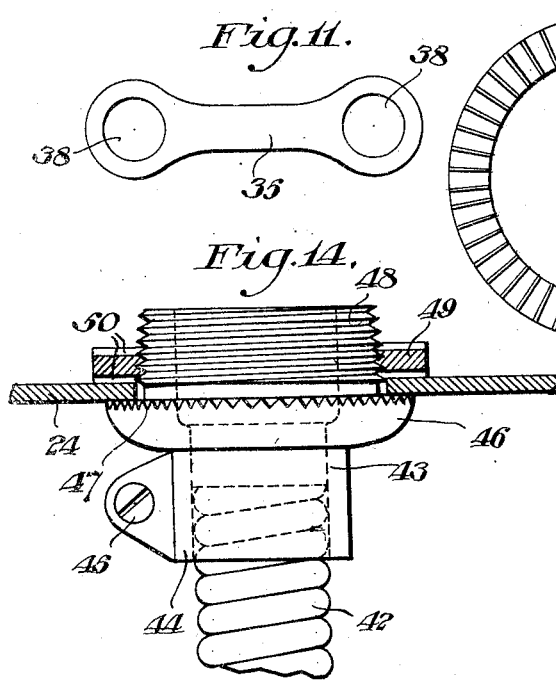
Inventor
Emil T. Hagist,
By Jas. C. Nobusmith
Attorney Patented Nov. 24, 1931

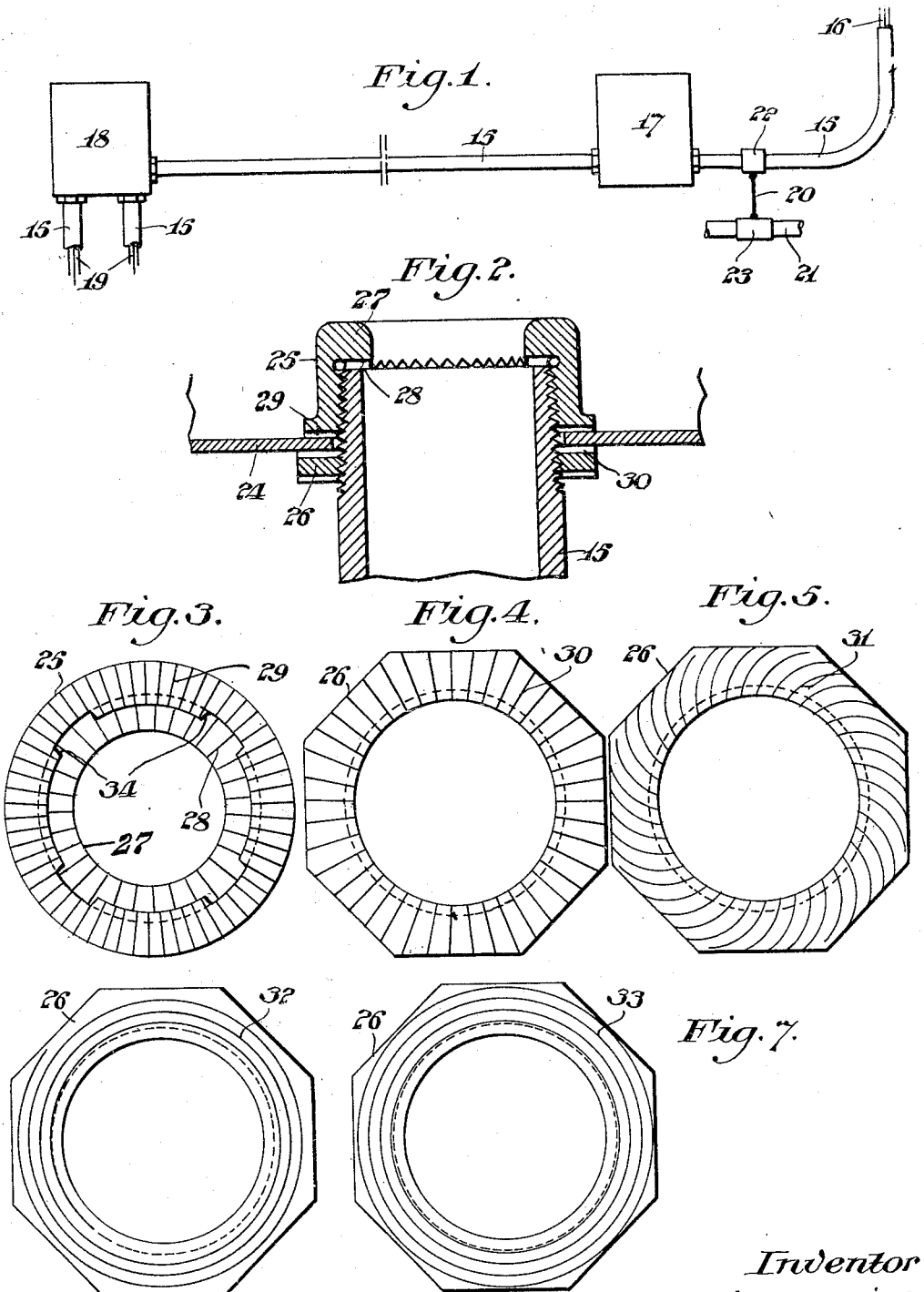

1,833,462

UNITED STATES PATENT OFFICE

EMIL T. HAGIST, OF GLENSIDE, PENNSYLVANIA

ELECTRICAL CONDUIT FITTINGS

Application filed January 29, 1929. Serial No. 335,906.

My invention relates to electrical conduit fittings, that is to say, to devices adapted to be used as component parts of electrical conduit structures in which electrical conductor wires, switches, and other parts of electrical distribution systems are located for the purpose of protection against injury.

In electrical conduit structures such as are commonly installed in and about buildings and the like, it is important to establish a metal to metal contact between the several parts of the conduit structure, so that there may be provided an electrical part through all parts of the same which will be sufficiently low in resistance to carry to ground any current which may pass to the conduit structure by reason of accidental electrical contact between the parts of the conduit structure and the enclosed electrical conductors.

It is well known that some or all of the parts of electrical conduit structures, as the same are commonly installed, are painted, varnished, enameled, or provided with a similar coating, to give the same as improved appearance, and as a protection against rust. Such coatings are usually applied to the junction boxes, fuse and switch boxes, and similar parts, as well as to the conduit pipes, including the initially threaded ends thereof. As such coatings are usually of material having low electrical conductivity, it frequently happens that parts of the conduit structure will be more or less insulated from the other parts thereof, thus interfering with the proper grounding of all the parts of the structure.

The object of my present invention is to provide, in an electrical conduit structure, a series of fittings which, while serving to unite mechanically the various parts of the conduit structure, will also insure a good electrical contact between the various parts thereof.

A further object of my invention is to provide a series of fittings which, while functioning as aforesaid, may be used in the customary manner in assembling the complete conduit structure, that is to say, which will be more or less automatic in effecting the desired electrical connections, so that no special attention need be given thereto by the mechanic, other than to see that good mechanical connections are made.

The nature and characteristic features of my invention will be more readily understood from the following description, taken in connection with the accompanying drawings forming part hereof, in which:

Figure 1 is an elevational view, to a certain extent diagrammatic, illustrating certain typical parts of an electrical conduit structure;

Fig. 2 is an enlarged sectional detail view illustrating certain fittings embodying the main features of my present invention, the same being shown in associated relationship with respect to the end of a conduit pipe and a box to which the same is attached;

Fig. 3 is an end elevational view of a bushing employed in the structure shown in Fig. 2;

Fig. 4 is a face view of a nut employed in the structure shown in Fig. 2;

Figs. 5, 6, and 7 are face views of similar nuts, illustrating alternative arrangements;

Fig. 8 is a plan view of a box with the cover removed, the same being shown with conduit pipes joined thereto, and provided with additional means for establishing electrical connections between various parts;

Fig. 9 is a fragmentary view similar to a portion of Fig. 8, but illustrating a modification;

Fig. 10 is an enlarged view, partly in section, illustrating certain details of the construction and arrangement shown in Fig. 8;

Fig. 11 is a face view of a connecting strap used in the arrangement shown in Figs. 8, 9, and 10;

Fig. 12 is a face view of a washer employed in the arrangement shown in Figs. 8, 9, and 10;

Fig. 13 is an edge view of the washer shown in Fig. 12; and

Fig. 14 is an elevational view, partly in section, illustrating means embodying my invention and used for attaching flexible conduit ducts and armored cable to the boxes.

Referring to the drawings, in Fig. 1 there is shown, more or less diagrammatically, an electrical conduit structure, including metallic pipes or ducts 15, through which the insulated service wires 16 are brought into the building, to a metal box 17 carrying switches, fuses, and the like (not shown), thence extending through the other pipe 15 to a junction box 18, from which the branch or extension wires 19 pass through other conduit pipes 15 attached to said box.

A ground wire 20 extends from the end of one of the conduit pipes 15 to a pipe 21, which may be one of the water supply pipes of the building in which the conduit structure is incorporated. The wire 20 is attached to the conduit pipe 15 by a ground clamp 22, of ordinary construction, and in like manner to the water pipe 21, by a similar ground clamp 23.

Referring now more particularly to Fig. 2 of the drawings, 24 represents the wall of one of the boxes of the conduit structure. The threaded end of the conduit pipe 15 extends in the usual manner through a suitable aperture in the wall 24 of the box. The end of the pipe 15 is mechanically secured to the wall of the box through which it extends, by means of a bushing 25, screw threaded on the end of the pipe and bearing against the inner face of the wall 24 of the box, and a nut 26, also screw threaded on the end of the pipe and bearing against the outer face of the wall 24 of the box.

The bushing 25 is provided with an inwardly extending lip portion 27, and the inner face of the lip portion 27 which is adapted to bear against the end of the conduit pipe 15, is serrated as at 28. The end face of the bushing 25 which is adapted to bear against the inner face of the wall 24 of the box, is also serrated, as at 29. It should here be noted that the faces of the bushing 25 which are thus serrated are at right angles to the axis of the screw threads of the bushing.

Both faces of the nut 26 are also serrated, as at 30. The serrations on the respective faces of the bushing 25 and nut 26 may be radially disposed, as shown in Figs. 3 and 4 of the drawings; or the same may, if desired, be made in spiral form, as shown at 31 in Fig. 5; or in a continuous spiral, as shown at 32 in Fig. 6; or in circular arrangement, as at 33 in Fig. 7. It will, of course, be understood that various other arrangements of the serrations may be made on the faces of the fittings if desired.

In assembling the conduit structure, the nut 26 is first threaded on the end of the pipe 15, being run up on the thread a considerable distance. By reason of both faces of the nut 26 being serrated, the nut may be placed on the pipe with either face foremost.

After the nut is placed on the pipe 15, the end of said pipe is inserted in the aperture in the wall 24 of the box. The bushing 25 is then threaded on the end of the pipe, being pulled up tightly on the threads. As the bushing 25 approaches the limit of its threading upon the pipe, the serrations 28 will encounter the end of the pipe 15, and as the mechanic continues to pull the same up tightly, the serrations will not only bite into any coating or layer of oxide which may be on the end of the pipe, but will also be dragged across the same, scratching away the coating to a clean fresh surface, so that an effective metal to metal contact will be insured between the inner face of the lip portion 27 of the bushing 25 and the end of the pipe 15.

In the manner above set forth, a good electrical connection between the various members will be insured, without any particular attention on the part of the mechanic other than the proper tightening of the fitting, in the manner which is customary in the use of ordinary fittings.

After the bushing 25 is tightened on the end of the pipe 15 in the manner above set forth, the nut 26 is then threaded back until the serrations on the face of the nut 26 which bears against the outer face of the wall 24 of the box will encounter the same, and as the tightening action continues, the serrations will not only bite into any coating or layer of oxide which may be on the outer face of the wall of the box, but will also scrape across the same, and thus insure a metal to metal contact, and consequently a good electrical connection between the nut 26 and the wall of the box.

It will also be noted that as the nut 26 is tightened to its final position, the serrations 29 in the end face of the bushing 25 will be caused to be brought into more intimate contact with the inner face of the wall 24 of the box.

The conduit pipes which are usually found in the market have their ends provided with initially cut threads which are ordinarily coated with paint, varnish, or the like, the same as the body of the pipe; or if not so coated, the threads are usually oxidized. In order to insure a good electrical connection with the threads, the fittings may, if desired, have a portion of their threads cut away, as at 34 (see Fig. 3), so that the sharp edges of the cut away portions may cut through the coating on the threads of the pipe, and clear the same in order to make a good electrical connection.

In Fig. 8 of the drawings, there is shown an arrangement which is adapted to be employed where there may be occasion for a relatively large amount of current to pass through the conduit structure to ground. For this purpose, there are provided conductor straps 35, preferably made of copper or other material of good electrical conductivity. These straps are preferably made in the form shown in Fig. 11 of the drawings, and are adapted to be inserted under the inner faces of the bushings 25.

If desired, washers 36 may be interposed between the ends of the conductor straps 35 and the inner face of the wall 24 of the box 18. The washers 36 are preferably provided on both faces thereof with serrations 37, similar to the serrations on the bushings 25 and nuts 26.

As the knockout plugs in the walls of the boxes are usually located at standard distances from each other, the conductor straps 35 may be provided at their end portions with apertures 38, located at correspondingly standardized distances from each other. When it is desired to use one of the conductor straps 35 for establishing a more efficient electrical connection between the conduit pipes extending into the wall of the box 18, at right angles to each other and near one of the corners of the box, the conductor strap may be suitably bent and folded on itself, as at 39 (see Fig. 8).

In Fig. 9 of the drawings, there is shown an alternative arrangement of the conductor straps 35. In this instance, the same are mounted on the outside of the box 18, in which case the washers 36 may be interposed between the ends of the conductor straps and the outer face of the wall 24 of the box 18. In this view, there is also shown a connection lug 40, which is riveted or otherwise secured to the conductor strap 35 for the purpose of attaching thereto a ground wire 41.

In Fig. 14 of the drawings, there is shown in assembled relationship an embodiment of my invention comprising a fitting for attaching a flexible conduit 42 to the boxes. In this instance, the end of the flexible conduit 42 is secured in a fitting 43, which is provided with a split collar portion 44 and a tightening nut 45, adapted to clamp the end of the flexible conduit to the end of the fitting. The fitting 43 is also provided with a flange portion 46, having serrations 47 on one face thereof, the serrated face being adapted to bear against the outer face of the wall 24 of the box.

The fitting 43 is also provided with a threaded portion 48, adapted to extend through the aperture in the wall 24 of the box. A nut 49 is mounted on the threaded portion 48 of the fitting 43, being complementally threaded with respect thereto, and this nut 49 is also provided with serrations 50 on the respective faces thereof.

While the structure shown in Fig. 14 has been described as applied to a flexible conduit, it will, of course, be understood that a similar fitting will be adaptable for securing the well known form of armored conductor cable to the wall of the box.

It will be seen that by the foregoing there is provided simple and efficient means for insuring that all parts of an electrical conduit structure will be bonded to each other by good electrical connections. When the parts of the conduit structure are thus bonded to each other, in the event of a short circuit between the structure and the electrical conductors contained within the same, a path of good electrical conductivity will be provided, so that the usual protecting fuses or the like will be blown, thus minimizing the fire hazard, as well as effecting a saving from losses through current leakage.

It will also be noted that, in the assembling of the conduit structure as herein described, the desired electrical connections between the various parts will be effected without any particular attention on the part of the mechanic other than to see that the bushings, nuts, etc., are pulled up to the proper degree of tightness.

Having thus described the nature and characteristic features of my invention, what I claim as new and desire to secure by Letters Patent, is:

1. A device for connecting the parts of an electrical conduit structure, having a screw threaded portion and a plurality of faces at right angles to the axis of the thread, each of said faces being serrated over its entire extent, the serrations being adapted to penetrate coatings on the parts of the electrical conduit structure which are connected thereby and to make good metal to metal contacts therewith, whereby the parts of the conduit structure which are normally non-current carrying may be effectively grounded.

2. A bushing for use in connecting the parts of an electrical conduit structure, said bushing having an internal screw thread and an inturned lip portion at one end thereof, the inner face of the lip portion at right angles to the axis of the thread being serrated, the serrations being adapted to penetrate coatings on the parts of the electrical conduit structure which are connected thereby and to make good metal to metal contacts therewith, whereby the parts of the conduit structure which are normally non-current carrying may be effectively grounded.

3. A bushing for use in connecting the parts of an electrical conduit structure, said bushing having an internal screw thread and an inturned lip portion at one end thereof, the other end of said bushing having a face at right angles to the axis of the thread, which face is serrated over its entire extent, the serrations being adapted to penetrate coatings on the parts of the electrical conduit structure which are connected thereby and to make good metal to metal contacts therewith, whereby the parts of the conduit structure which are normally non-current carrying may be effectively grounded.

4. A bushing for use in connecting the parts of an electrical conduit structure, said bushing having an internal screw thread and an inturned lip portion at one end thereof, the other end of said bushing having a serrated face at right angles to the axis of the thread, and the inner face of the lip portion at right angles to the axis of the thread being serrated, the serrations being adapted to penetrate coatings on the parts of the electrical conduit structure which are connected thereby and to make good metal to metal contacts therewith, whereby the parts of the conduit structure which are normally non-current carrying may be effectively grounded.

5. A nut for connecting the parts of an electrical conduit structure, said nut having an internal screw thread, and its two faces at right angles to the axis of the thread being serrated over their entire extent, the serrations being adapted to penetrate coatings on the parts of the electrical conduit structure which are connected thereby and to make good metal to metal contacts therewith, whereby the parts of the conduit structure which are normally non-current carrying may be effectively grounded.

6. In an electrical conduit structure, means for connecting a tube and a casing forming parts of said structure, comprising a bushing and a nut threaded on the tube and embracing between them a wall of the casing, said bushing having serrated faces respectively engaging the wall and the end of the tube and adapted to penetrate coatings thereon and to make good metal to metal contacts therewith, whereby the parts of the conduit structure which are normally non-current carrying may be effectively grounded.

7. In an electrical conduit structure, means for connecting a tube and a casing forming parts of said structure, comprising a bushing and a nut threaded on the tube and embracing between them a wall of the box, said nut having both faces at right angles to the axis of the nut serrated over their entire extent and adapted to penetrate a coating on said wall and to make a good metal to metal contact therewith, whereby the parts of the conduit structure which are normally non-current carrying may be effectively grounded.

8. In an electrical conduit structure, means for connecting a tube and a casing forming parts of said structure, comprising a bushing and a nut threaded on the tube and embracing between them a wall of the casing, said bushing and nut each having a plurality of serrated bearing surfaces, and a conductor strap having one end also embraced between said bushing and nut, and engaged by serrated faces thereof, whereby the parts of the conduit structure which are normally non-current carrying may be effectively grounded.

9. In an electrical conduit structure, means for connecting a tube and a casing forming parts of said structure, comprising a bushing and a nut threaded on the tube and embracing between them a wall of the casing, said bushing and nut each having a plurality of serrated bearing surfaces; a conductor strap having one end also embraced between said bushing and nut, and a washer interposed between said conductor strap and the wall of the casing having both bearing faces serrated over their entire extent, whereby the parts of the conduit structure which are normally non-current carrying may be effectively grounded.

In testimony whereof, I have hereunto signed my name.

EMIL T. HAGIST.